(12) United States Patent
Zhou

(10) Patent No.: US 10,228,103 B1
(45) Date of Patent: Mar. 12, 2019

(54) SOLAR LAMP

(71) Applicant: DONGGUAN THAILIGHT SEMICONDUCTOR LIGHTING CO., LTD, Dongguan, Guangdong (CN)

(72) Inventor: Wenbo Zhou, Guangdong (CN)

(73) Assignee: DONGGUAN THAILIGHT SEMICONDUCTOR LIGHTING CO., LTD., Dongguan, Guangdong Province (CN)

( * ) Notice: Subject to any disclaimer, the term of this patent is extended or adjusted under 35 U.S.C. 154(b) by 0 days.

(21) Appl. No.: 15/862,600

(22) Filed: Jan. 4, 2018

(30) Foreign Application Priority Data

Sep. 8, 2017 (CN) .................... 2017 2 1149839 U

(51) Int. Cl.
  F21L 4/08 (2006.01)
  F21S 8/08 (2006.01)
  F21S 9/03 (2006.01)
  F21V 21/26 (2006.01)
  F21V 23/04 (2006.01)
  H05B 37/02 (2006.01)
  F21Y 107/90 (2016.01)
  F21Y 115/10 (2016.01)

(52) U.S. Cl.
  CPC .............. *F21S 9/037* (2013.01); *F21L 4/08* (2013.01); *F21V 21/26* (2013.01); *F21V 23/0428* (2013.01); *F21V 23/0442* (2013.01); *F21S 8/086* (2013.01); *F21S 9/032* (2013.01); *F21Y 2107/90* (2016.08); *F21Y 2115/10* (2016.08); *H05B 37/02* (2013.01)

(58) Field of Classification Search
  CPC .. F21S 8/043; F21S 8/036; F21S 8/086; F21S 9/037; F21V 21/26; F21V 23/0471; F21V 14/02
  See application file for complete search history.

(56) References Cited

U.S. PATENT DOCUMENTS

| 6,764,202 | B1 * | 7/2004 | Herring ................. | E04H 13/001 |
| | | | | 362/183 |
| 7,631,982 | B1 * | 12/2009 | D'Onofrio .............. | F21S 9/037 |
| | | | | 362/147 |
| 2006/0109651 | A1 * | 5/2006 | Cocciardi ............. | F21V 21/088 |
| | | | | 362/253 |
| 2008/0298051 | A1 * | 12/2008 | Chu ........................ | F21S 8/086 |
| | | | | 362/183 |

(Continued)

Primary Examiner — Alexander K Garlen
(74) Attorney, Agent, or Firm — Cheng-Ju Chiang

(57) ABSTRACT

The present application discloses a solar lamp, comprising a main frame, a solar panel, an LED light panel, a sensor switch and a mounting base. The solar panel is fixed to the main frame. The LED light panel is movably connected to the main frame, and forms an included angle of 0-100 degrees with respect to a plane where the main frame is located. The sensor switch is mounted on a bottom face of the main frame, and is opposite the ground. The mounting base is connected to the main frame, and is provided with an adapter. The lamp senses presence and absence of a user via the sensor switch so as to switch on or off lights, thereby realizing effects of power saving and automatic switch-on and switch-off; and the illumination direction of the LED light panel is adjustable.

8 Claims, 2 Drawing Sheets

(56) References Cited

U.S. PATENT DOCUMENTS

| | | | |
|---|---|---|---|
| 2010/0328932 A1* | 12/2010 | Fogerlie | F21S 8/086 362/183 |
| 2011/0001455 A1* | 1/2011 | Dowdy | F21S 9/02 320/107 |
| 2011/0242819 A1* | 10/2011 | Mitchell | B60Q 1/0483 362/311.02 |
| 2013/0058078 A1* | 3/2013 | Meng | F21S 9/037 362/191 |
| 2014/0036521 A1* | 2/2014 | Elliott | F21V 21/116 362/459 |
| 2014/0160738 A1* | 6/2014 | Rozot | F21S 2/005 362/191 |
| 2014/0211459 A1* | 7/2014 | Toner | E04H 12/32 362/183 |
| 2014/0355259 A1* | 12/2014 | Ku | F21S 9/037 362/183 |
| 2015/0377433 A1* | 12/2015 | Yang | F21S 9/037 362/183 |

* cited by examiner

SOLAR LAMP

CROSS-REFERENCE TO PRIOR APPLICATION

This application claims the benefit of Chinese Utility Model Application No. 201721149839.7 filed on Sep. 8, 2017, the contents of which are incorporated herein by reference.

TECHNICAL FIELD

The present application relates to the field of lamp structures, and specifically to a solar lamp.

BACKGROUND ART

A solar lamp is an electric lamp using electric energy generated by a solar battery panel converting solar energy into electricity. During the daytime, even on a cloudy day, the solar panel can also collect and store solar energy. The solar lamp, as a new, safe and environment-friendly lamp, has received more and more attention. Solar lamps on the market are mounted mostly in a fixed manner, and thus are inconvenient to dismount when replacement is needed. In terms of illumination, most of solar lamps on the market are of permanent illumination, namely, using a button to realize switch-on and switch-off. If the solar lamps are not switched off in time, permanent illumination is also a waste in terms of resource costs.

SUMMARY OF THE APPLICATION

In order to overcome the deficiencies in the prior art, the present application aims at providing a solar lamp, which senses presence and absence of a user via a sensor switch so as to switch on or switch off lighting, thereby realizing effects of power saving and automatic switch-on and switch-off, and wherein an illumination direction of an LED light panel is adjustable.

The present application is realized by the following technical solutions: a solar lamp, comprising a main frame, a solar panel, an LED light panel, a sensor switch and a mounting base, wherein the solar panel is fixed to the main frame; the LED light panel is movably connected to the main frame, and forms an included angle of 0-100 degrees with respect to a plane where the main frame is located; the sensor switch is mounted on a bottom face of the main frame, and is opposite the ground; and the mounting base is connected to the main frame, and is provided with an adapter.

Further, two sides of the LED light panel are respectively connected to the main frame in a pivotable manner.

Further, light emitting beads of the LED light panel are arranged in a matrix form.

Further, the sensor switch is a microwave sensing switch.

Further, a sensing range of the microwave sensing switch covers an area within a 7-meter radius of the microwave sensing switch.

Further, the mounting base is connected to a side edge of the main frame via cooperation of bolts and nuts, with the bolts penetrating through the mounting base and the main frame.

Further, the mounting base is pivotally connected to the main frame, the adapter comprises at least two pressing sheets, an adapter through-hole is surrounded and formed by the at least two pressing sheets, and the diameter of the adapter through-hole increases as a distance between the at least two pressing sheets increases.

Further, the mounting base is fixedly connected to the main frame, and the adapter is a sleeve.

Further, an extension direction of the sleeve is parallel with the plane where the main frame is located.

Further, the mounting base is pivotally connected to the main frame, and the adapter is a sleeve.

In contrast to the prior art, the beneficial effects of the present application are as follows:

1) in the present application, presence and absence of a user is sensed via the sensor switch so as to switch on or off lighting, thereby realizing effects of power saving and automatic switch-on and switch-off;

2) in the present application, an illumination angle of the LED light panel is adjustable, which is more flexible in use by adjusting an illumination direction according to demands; and 3) in the present application, the main frame is fixedly mounted in an illumination area via the mounting base, facilitating flexible usage.

Figure 1:
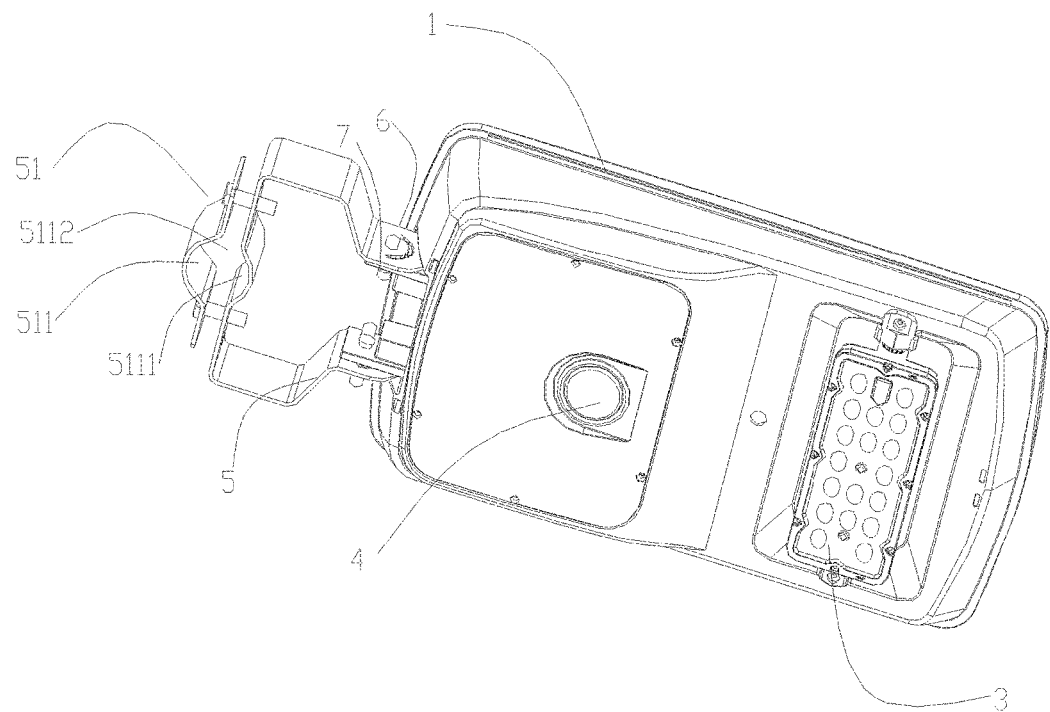
FIG. 1 is a front structural schematic diagram of embodiment I of the present application.

In the figures: main frame 1; solar panel 2; LED light panel 3; microwave sensing switch 4; mounting base 5; adapter 51; pressing sheet 511; recessed portion 5111; adapter through-hole 5112; pin 6; and nut 7.

DETAILED DESCRIPTION OF EMBODIMENTS

Hereinafter, the application will be further described in conjunction with the accompanying drawings and particular embodiments.

Embodiment I

Figure 2:
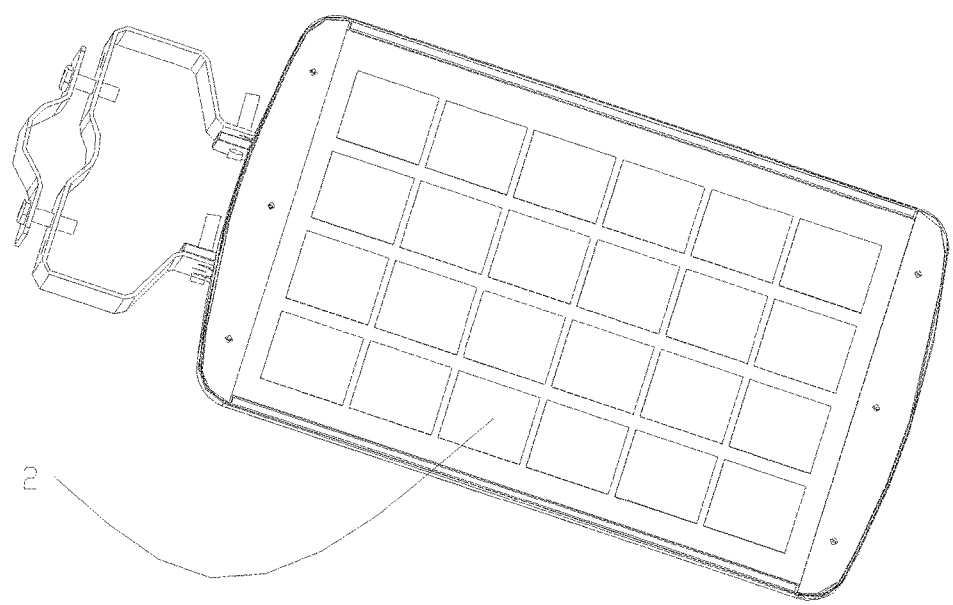
FIG. 2 is a back structural schematic diagram of embodiment I of the present application.

With reference to FIGS. 1 and 2, a solar lamp comprises a main frame 1, a solar panel 2, an LED light panel 3, a microwave sensing switch 4 and a mounting base 5. The solar panel 2 is fixed to the main frame 1. Two sides of the LED light panel 3 are respectively connected to the main frame 1 in a pivotable manner, and forms an included angle of 0-100 degrees with respect to a plane where the main frame 1 is located by means of active adjustment. The microwave sensing switch 4 is mounted on a bottom face of the main frame 1, and is opposite the ground. A sensing range of the microwave sensing switch 4 covers an area within a 7-meter radius of the microwave sensing switch 4.

The mounting base 5 is connected to a side edge of the main frame 1 via cooperation of bolts 6 and nuts 7, with the bolts 6 penetrating through the mounting base 5 and the main frame 1.

The solar panel 2 is provided in a position exposed to the sun, including but not limited to an upper surface of the main frame 1, and can also be fixedly connected to other portions of the main frame 1 according to different usage scenes and illumination directions.

Light emitting beads of the LED light panel 3 are arranged in a matrix form.

An adapter 51 comprises two pressing sheets 511, wherein the two pressing sheets 511 are provided opposite each other, the pressing sheets 511 are provided with semicircular recessed portions 5111, and the semicircular recessed portions 5111 are joined to each other, such that an adapter through-hole 5112 is formed in the center. As the distance between the two opposing pressing sheets 511 is adjusted, the diameter of the adapter through-hole 5112 changes accordingly so as to adapt to different mounting positions. Connection means of the two pressing sheets 511 include but are not limited to penetrating connection by using bolts or pins.

When in use, a fixing end, such as a support column or a lamp column, penetrates through the adapter through-hole 5112, and then the two pressing sheets 511 are fastened together so as to enable the pressing sheets 511 to clamp the fixing ends, thus realizing mounting of the solar lamp. The main frame 1 rotates upwards and downwards relative to the mounting base 5, such that the angle of the main frame 1 is adjustable so as to adapt mounting positions. For example, if the mounting position is in a narrow space, the main frame 1 may turn over upwards to a position where an included angle between the main frame and the mounting base 5 is greater than 90 degrees so as to decrease an occupied space in a horizontal direction, and then the LED light panel 3 is rotated so as to adjust the illumination direction. Rotation of the main frame 1 relative to the mounting base 5 can also cooperate with rotation of the LED light panel 3 so as to adjust the illumination direction. When a user walks into the sensing range of the microwave sensing switch 4, the solar lamp is triggered and turns on, thereby realizing illumination; and when the user leaves the sensing range, the solar lamp turns off, thereby finishing the illumination.

Embodiment II

Figure 3:
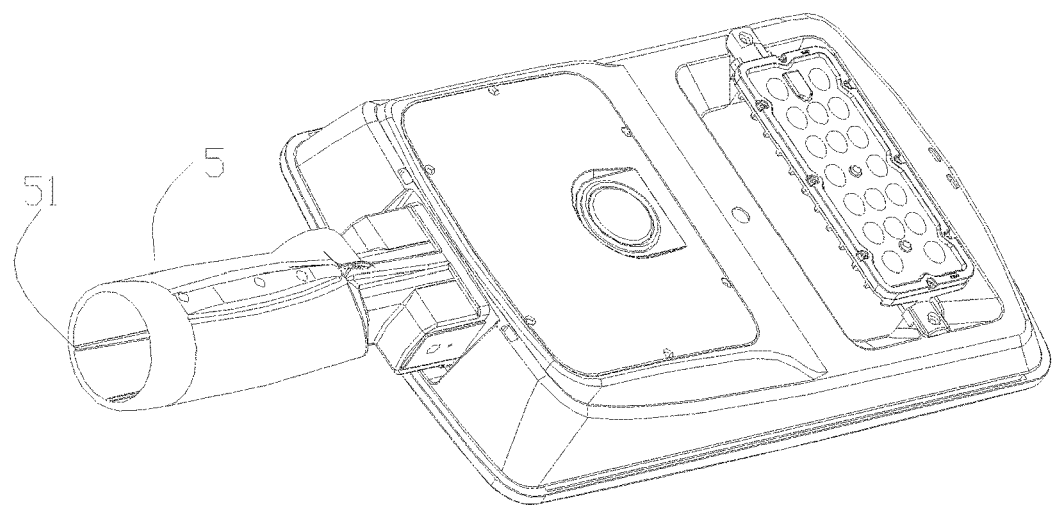
FIG. 3 is a structural schematic diagram of embodiment II of the present application.

With reference to FIG. 3, this embodiment is characterized in that the mounting base 5 is fixedly connected to the main frame 1; and the adapter 51 is a sleeve, wherein an extension direction of the sleeve is parallel with the plane where the main frame 1 is located. The remaining structures and features are the same as those in embodiment I.

In embodiment II, the sleeve is directly sleeved around fixing ends such as the support column or lamp column so as to realize mounting in one step, facilitating quick and convenient use.

Embodiment III

Figure 4:
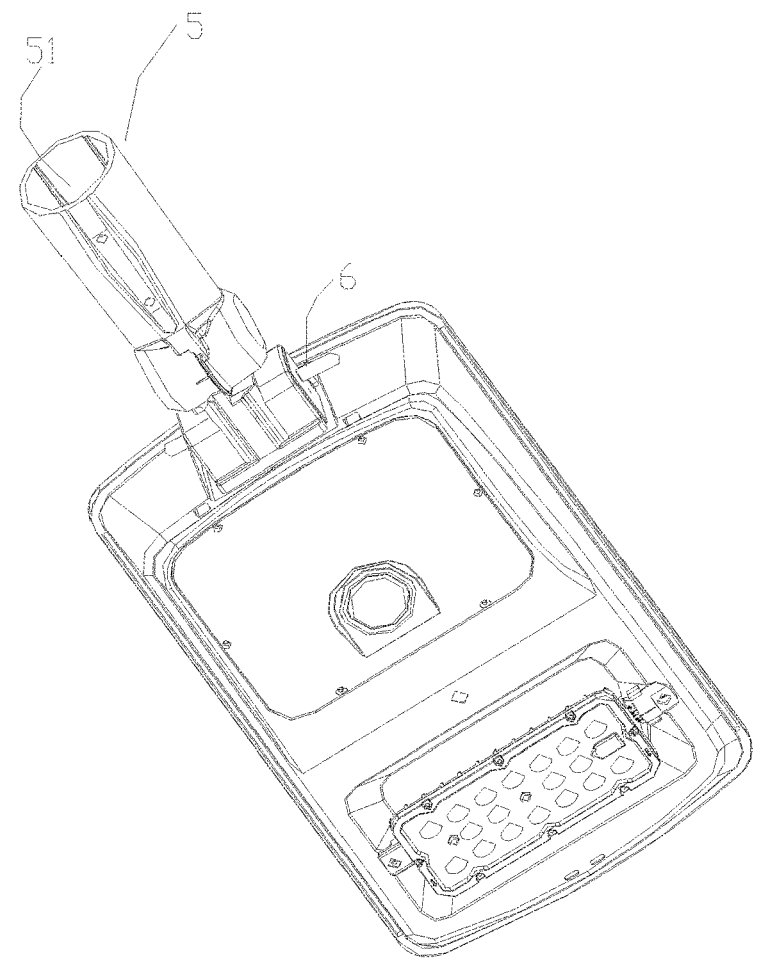
FIG. 4 is a structural schematic diagram of embodiment III of the present application.

With reference to FIG. 4, this embodiment is characterized in that the mounting base 5 is pivotally connected to the main frame 1 via the bolts 6, and the adapter 51 is a sleeve. The remaining structures and features are the same as those in embodiment I.

In embodiment III, the sleeve is directly sleeved around fixing ends such as the support column or lamp column so as to realize mounting in one step; and the angle of the main frame 1 is adjusted via the rotation of the main frame 1 relative to the mounting base 5 so as to adapt to the mounting and illumination positions.

For a person skilled in the art, other various corresponding changes or variations can be made according to the technical solutions and conception described above, and all of these changes and variations should fall within the scope of protection of the claims of the present application.

The invention claimed is:

1. A solar lamp, comprising a main frame, a solar panel, an LED light panel, a sensor switch and a mounting base, wherein the solar panel is fixed to a top face of the main frame; the LED light panel is pivotally connected to and movable relative the main frame on two sides of the LED light panel respectively, and forms an included angle of 0-100 degrees with respect to a plane where the main frame is located; the sensor switch and the LED light panel are mounted on a bottom face of the main frame; and the mounting base is pivotally connected to and movable relative the main frame, and is provided with an adapter.

2. The solar lamp of claim 1, wherein light emitting beads of the LED light panel are arranged in a matrix form.

3. The solar lamp of claim 1, wherein the sensor switch is a microwave sensing switch.

4. The solar lamp of claim 1, wherein a sensing range of the microwave sensing switch covers an area within a 7-meter radius of the microwave sensing switch.

5. The solar lamp of claim 1, wherein the mounting base is connected to a side edge of the main frame via cooperation of bolts and nuts, with the bolts penetrating through the mounting base and the main frame.

6. The solar lamp of claim 1, wherein the adapter comprises at least two pressing sheets, an adapter through-hole is surrounded and formed by the at least two pressing sheets, and the diameter of the adapter through-hole increases as a distance between the at least two pressing sheets increases.

7. The solar lamp of claim 1, wherein the adapter is a sleeve.

8. The solar lamp of claim 7, wherein an extension direction of the sleeve is parallel with the plane where the main frame is located.

* * * * *